United States Patent [19]

Wack

[11] Patent Number: 5,542,516

[45] Date of Patent: Aug. 6, 1996

[54] FRICTION CLUTCH FOR A TRANSMISSION OF A MOTOR VEHICLE AND A CLUTCH PLATE FOR A FRICTION CLUTCH

[75] Inventor: Erwin Wack, Niederwerrn, Germany

[73] Assignee: Fichtel & Sachs AG, Schweinfurt, Germany

[21] Appl. No.: 322,591

[22] Filed: Oct. 13, 1994

[30] Foreign Application Priority Data

Oct. 15, 1993 [DE] Germany .......................... 43 35 211.1

[51] Int. Cl.$^6$ .............................. F16D 13/64; F16D 3/14
[52] U.S. Cl. .................. 192/70.17; 192/213.22; 464/68
[58] Field of Search .......................... 192/70.17, 106.2, 192/213.22; 464/68

[56] References Cited

U.S. PATENT DOCUMENTS

| | | | |
|---|---|---|---|
| 3,931,876 | 1/1976 | Beeskow et al. ................... | 192/106.2 |
| 4,496,036 | 1/1985 | Loizeau ............................... | 192/106.2 |
| 5,209,334 | 5/1993 | Fischer et al. ..................... | 192/106.2 |

FOREIGN PATENT DOCUMENTS

| | | |
|---|---|---|
| 0475283 | 3/1992 | European Pat. Off. . |
| 0502529 | 9/1992 | European Pat. Off. . |
| 2916868 | 11/1980 | Germany . |
| 4028616 | 3/1992 | Germany . |
| 2210435 | 6/1989 | United Kingdom . |
| 2254398 | 10/1992 | United Kingdom . |

*Primary Examiner*—Richard M. Lorence
*Attorney, Agent, or Firm*—Nils H. Ljungman and Associates

[57] ABSTRACT

A friction clutch has a clutch plate with a hub and hub disc concentric to an axis of rotation, a lining support with friction linings, located on the one side of the hub disc, and a cover plate located on the other side. Coil springs for the load range can be located in preferably aligned apertures of the hub disc and of the lining supports and cover plate, and the coil springs can be in contact, on one end, with control edges of the apertures of lining supports and cover plate, and on the other end, with stop tabs of load friction discs located on both sides of the hub disc. At least one of the friction discs can have webs to hold stop tabs on a ring-shaped base-body, wherein the stop tabs can be reinforced so that stresses which are generated by torque transmitted by the applied forces can be limited. For this purpose, the stop tabs can be designed in one piece both with the web and also with a brace oriented at an angle to the web, and the stop tabs can be provided, in the area of engagement with the spring, with a reinforcement cross section which can be elastically deformed by the application of force.

20 Claims, 5 Drawing Sheets

I-I

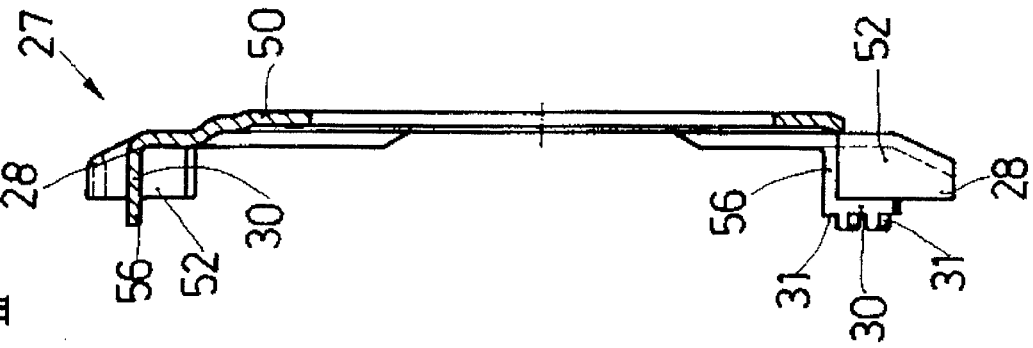
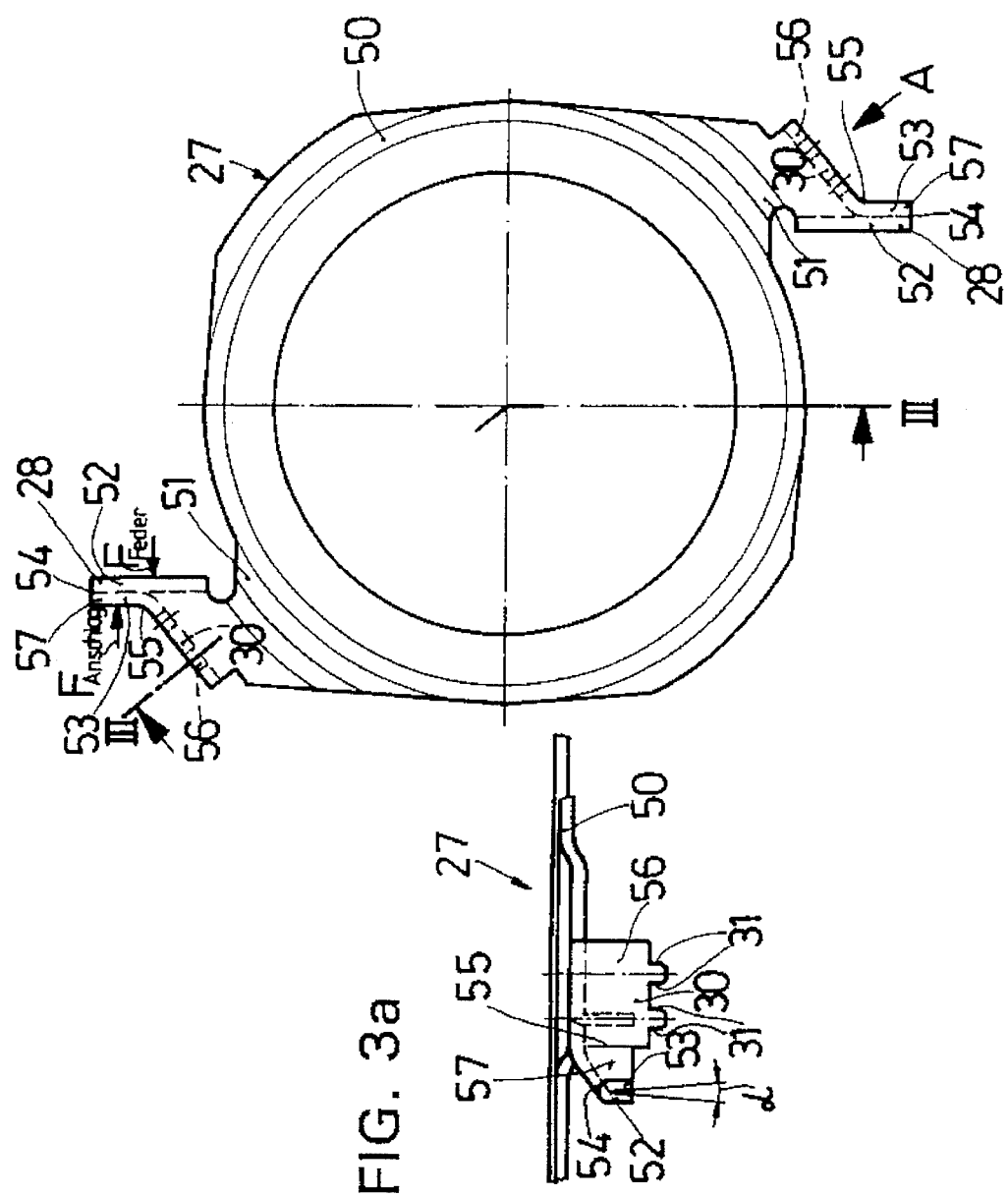

FRICTION CLUTCH FOR A TRANSMISSION OF A MOTOR VEHICLE AND A CLUTCH PLATE FOR A FRICTION CLUTCH

BACKGROUND OF THE INVENTION

1. Field of the Invention

This invention generally relates to a friction clutch for a transmission of a motor vehicle, wherein the friction clutch has a clutch plate. In addition, the invention also more specifically relates to a torsional vibration damper and a clutch plate for a friction clutch.

In general, a friction clutch for a transmission of a motor vehicle can have a hub which defines an axis of rotation, which hub can receive a drive shaft of a transmission therein. About the hub, and concentric to the axis of rotation, there can be a hub disc. In addition, cover plates can be located on both sides of the hub disc and can be firmly and non-rotationally connected to one another and held at a distance from one another.

At least one of the cover plates, in a radially outward location, can have friction linings. Coil springs for the load range of the friction clutch can be disposed in apertures in the hub disc on one hand, and in the lining support and cover plate on the other hand. Such an arrangement can also include a friction device between the hub disc and cover plates, which friction device can include load friction discs located on both sides of the hub disc. The coil springs can preferably be in contact, on one end thereof, with control edges of the apertures of the lining support and cover plates, while at the other end can be in contact with stop tabs of the load friction discs. At least one of the friction discs can be a ring-shaped base body having webs to hold the stop tabs.

2. Background Information

Federal Republic of Germany Laid Open Patent Application No. 40 28 616 A1 discloses a known clutch plate on which there are two load friction discs, with one disc being located on either side of the hub disc. During the idle phase, one of these load friction discs follows the driving-side clutch elements, such as the lining supports, or the cover plate in a friction-tight fashion. This load friction disc has stop tabs. Each of the stop tabs can be engaged between a spring provided for load operation, and a control edge of an aperture corresponding to the spring. During load operations, the stop tabs can be brought into contact, via the spring, against this control edge. On account of the non-rotational connection of one load friction disc with the other friction disc, these friction discs participate in the motion of the hub and execute a relative movement with respect to the driving-side clutch elements. Since one of the load friction discs is pressurized, with a friction force, by a spring acting in the axial direction, and this axial application of force is transmitted to the other load friction disc, the two load friction discs produce a friction force which is effective during load operation.

When a stop tab encounters the corresponding control edge, the stop tab must generally absorb a force on both active surfaces thereof. This is essentially due to the pressure which is being applied to the stop tabs, on its opposite side away from the control edge, by the spring located in the corresponding aperture. Since, during load operation, the load friction disc participates in the motion of the hub disc and tends to follow any wobbling motion of the hub disc, the stop tabs can be moved into a position relative to the control edge in which the forces applied to the active surfaces of the stop tabs are transmitted, with different lever arms, to the web connecting the stop tabs to the remaining part of the load friction disc. The result can be a torque which acts on the stop tabs, and which leads to the accumulation of stresses in the above-mentioned web. These stresses can be sufficiently high to thereby result in a rupture in the vicinity of the web. To prevent such a rupture, the stop tabs on such load friction discs are conventionally subjected to a heat treatment to increase their strength. However, such a heat treatment can be complex, time-consuming and expensive.

OBJECT OF THE INVENTION

The object of the present invention is to design load friction discs for a clutch plate so that, even in an unfavorable position of the corresponding stop tabs relative to a corresponding control edge, any stresses which might be generated by a torque initiated by the applied forces can be limited.

SUMMARY OF THE INVENTION

The present invention teaches that this object can be achieved by forming each stop tab in one piece, both with the web and also with a brace oriented at an angle to the web. Further, in an area of engagement of the stop tabs with the spring, the stop tabs can preferably be provided with a reinforced cross section that can preferably be deformed elastically by the application of a force to the cross-section.

As a result of the one-piece design of the web and the brace, the stop tabs can be supported on the above-mentioned elements, that is, in at least one possible embodiment, preferably on the control edges of the apertures and on the ends of the springs. In this manner, the rigidity of the stop tabs can be significantly increased. In addition, such a configuration as provided by the present invention can also enable at least a portion of the forces applied to these elements to be transmitted, so that the stresses which occur in the stop tabs can be relatively low and can be distributed in a manner which prevents any stress peaks which could damage the components. Moreover, at least one configuration as provided by the present invention preferably has no interruptions, or discontinuities, between the stop tabs and the brace on the one hand, and between the stop tabs and the web on the other hand. Thus, the occurrence of a notch stress, which notch stress could also result in the stop tabs breaking loose from the rest of the load friction disc, can essentially be prevented.

As a result of the configuration of the stop tabs with an elastically deformable reinforced cross section, forces can be absorbed flexibly, so that the transmission of hard impacts on the stop tabs can be prevented. In addition, the provision of the elastically deformable cross-section can provide the addition of a reinforcement substantially precisely at the point of the stop tabs at which the forces are applied. The result can be a further reduction of the danger of a rupture on the stop tabs.

Another configuration of the present invention provides that each stop tab can be configured with a portion which projects beyond the brace, in preferably a substantially radial direction. This portion of the stop tabs can essentially be provided for the application of force. With such a configuration, the forces on the stop tabs can be conducted to that portion of the stop tabs in which there is preferably the greatest stability. This greatest stability can essentially be a result of the support of the stop tab portion on the web and brace on the one hand, and as a result of the reinforcement of the cross-section of the stop tab on the other hand.

In a further embodiment of the present invention, the stop tabs are preferably designed to take optimum advantage of their elasticity, or spring action, with optimum support. For this purpose, the stop tabs can preferably be designed with a first tab part which can be connected to the web, and a second tab part which can be designed as one piece with the brace. This second tab part can thereby act as a cross-section reinforcement, and this reinforcement section can preferably be bent at an angle of between about 90 degrees and about 180 degrees in relation to the first tab part. As a result of the angular orientation of the two parts of the stop tab, these parts can execute a relative motion with respect to one another. This relative motion, on account of the resistance to deformation of the material used for the stop tabs, can thereby provide a damping action. Preferably, the material used for the stop tabs can have an elastic behavior, and thus, on account of the elastic behavior of the material, after an applied force is removed, the two parts can preferably return elastically to their original position.

The above angular range of between about 90 degrees to about 180 degrees is essentially an angular range in which the relative deformation and elastic return can be possible. However, an angle of approximately 180 degrees can provide a configuration which may be best-suited for the purpose, since although a certain spring travel is available, it should preferably be kept very short in the interest of an action of the stop tabs, which action is typically not excessively soft. At this angle, the two parts of the stop tab preferably run approximately parallel to one another.

In an additional embodiment of the present invention, the brace can preferably be provided on one load friction disc, and this brace can preferably be used as an axial support for the other load friction disc. As such, the bracing essentially can serve a dual function.

It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, with respect to one another.

One aspect of the invention resides broadly in a friction clutch for a transmission for a motor vehicle, the friction clutch comprising: a housing; a clutch plate disposed within the housing, the clutch plate defining an axis of rotation and an axial direction parallel to the axis of rotation; pressure plate apparatus disposed within the housing and movable in the axial direction, the pressure plate apparatus for applying an axial force to the clutch disc along the axial direction; biasing apparatus for biasing the pressure plate apparatus in the axial direction to apply the axial force to the clutch disc; apparatus for applying an opposing force to the biasing apparatus to release the axial force being applied by the biasing apparatus to the pressure plate apparatus; the clutch plate comprising: a hub, the hub comprising apparatus for engaging shaft apparatus of a transmission; a hub disc disposed concentrically about the hub and extending radially away from the hub, the hub disc having a first side and a second side; a first cover plate disposed adjacent the first side of the hub; a second cover plate disposed adjacent the second side of the hub; at least one of the first and second cover plates comprising at least one friction lining; the first and second cover plates being relatively rotatable about the hub with respect to the hub disc; biasing apparatus for torsionally damping relative rotation between the hub disc and the first and second cover plates; at least one friction disc disposed about the hub between the hub disc and one of the first and second cover plates; the at least one friction disc having a main surface substantially transverse to the axis of rotation; the at least one friction disc comprising at least one first portion for engaging with the biasing apparatus; the at least one first portion comprising: a first substantially planar member having a first surface substantially transverse to the main surface, the first surface being disposed to engage the biasing apparatus and receive biasing force of the biasing apparatus, and a second surface disposed opposite the first surface; and a second substantially planar member disposed in contact with the second surface for reinforcing the at least one first substantially planar member and increasing rigidity of the first substantially planar member.

Another aspect of the invention resides broadly in a clutch plate for a friction clutch, the clutch plate defining an axis of rotation and an axial direction parallel to the axis of rotation, and the clutch plate comprising: a hub, the hub comprising apparatus for engaging shaft apparatus of a transmission; a hub disc disposed concentrically about the hub and extending radially away from the hub, the hub disc having a first side and a second side; a first cover plate disposed adjacent the first side of the hub; a second cover plate disposed adjacent the second side of the hub; at least one of the first and second cover plates comprising at least one friction lining; the first and second cover plates being relatively rotatable about the hub with respect to the hub disc; biasing apparatus for torsionally damping relative rotational movement between the hub disc and the first and second cover plates; at least one friction disc disposed about the hub between the hub disc and one of the first and second cover plates, the at least one friction disc defining a main surface substantially transverse to the axis of rotation; the at least one friction disc comprising at least one portion for engaging with the biasing apparatus; the at least one portion for engaging comprising apparatus for engaging with and receiving a biasing force of the biasing apparatus; the apparatus for engaging comprising first and second planar members, the first and second planar members being disposed substantially parallel to one another and substantially transverse to the main plane, with the first planar member disposed towards the biasing member, and with at least a portion of the first planar member disposed spaced apart from the second planar member; and the at least a portion of the first planar member being elastically deformable towards the second planar member by apparatus of the biasing force to absorb at least a portion of the biasing force.

BRIEF DESCRIPTION OF THE DRAWINGS

The invention is explained below in greater detail with reference to the embodiments illustrated in the accompanying drawings, in which:

FIG. 3 shows a load friction disc, enlarged and in detail;

FIG. 3a shows a section taken along line III—III of FIG. 3,

FIG. 3b shows a view taken in the direction of arrow A of FIG. 3, and

DESCRIPTION OF THE PREFERRED EMBODIMENTS

Figure 1:
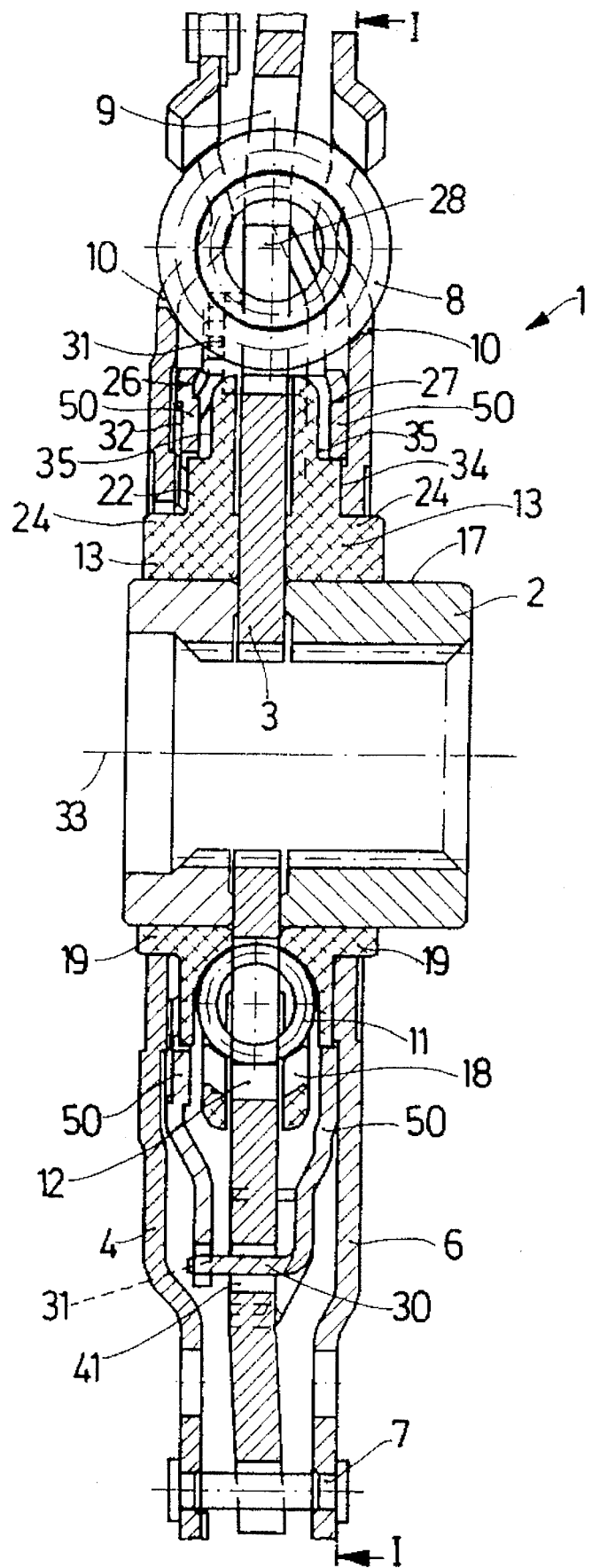
FIG. 1 shows a longitudinal section through a clutch plate.

One type of clutch plate 1 in accordance with the present invention can be constructed as follows:

A hub 2 can preferably be provided with a hub disc 3 which extends radially outwardly from the hub 2. The hub 2 can preferably be constructed with rotational symmetry with respect to an axis of rotation 33, and can preferably be provided with internal gear teeth 2a (see FIG. 1a ) for establishing a non-rotational installation on a transmission shaft 2b. The hub disc 3 can preferably have apertures 9 and 12, preferably located at two different diameters of disc 3. The apertures 12 can be located on a smaller diameter and can preferably be used to hold coil springs 11 for providing at least a torsional damping action in the idle range of operation of the friction clutch. The apertures 9, on the other hand, can preferably be designed to hold coil springs 8 for providing at least a torsional damping in the load range of operation of the friction clutch.

On a first side of the hub disc 3 there can preferably be a lining support 4, while on a second side of the hub disc 3 there can preferably be a cover plate 6. The lining support 4 and the cover plate 6 can be non-rotationally connected to one another by means of connecting rivets 7. The connecting rivets 7 can also preferably be configured to hold the lining support 4 and cover plate 6, at least in the radially outer portions thereof, at a distance from one another. The lining support 4, in its radially-outward area, as shown in FIG. 1a, preferably supports at least one friction lining 9a, which friction lining 9a can be designed in a known manner. The lining support 4, and the cover plate 6 can preferably have apertures 10 to hold the coil springs 8.

As is also depicted in FIG. 1a, a friction clutch can also have a housing 60 which essentially encloses one side of the clutch plate, and which housing can be used to attach the clutch to a flywheel 61 of a transmission. There can also be a pressure plate 62 for applying a pressure to the linings 9a to engage the linings 9a with the flywheel 61. A biasing member 63 can also be provided for applying the force to the pressure plate 62. In addition, a release mechanism 64, shown only schematically, can also be provided to release the biasing member 63 from the pressure plate 62 to disengage the friction linings 9a from the flywheel 61. In essence, components such as the housing 60, flywheel 61, pressure plate 62, biasing member 63, and release device 64 are well known, and are therefore not discussed in any more detail herein.

Figure 1A:
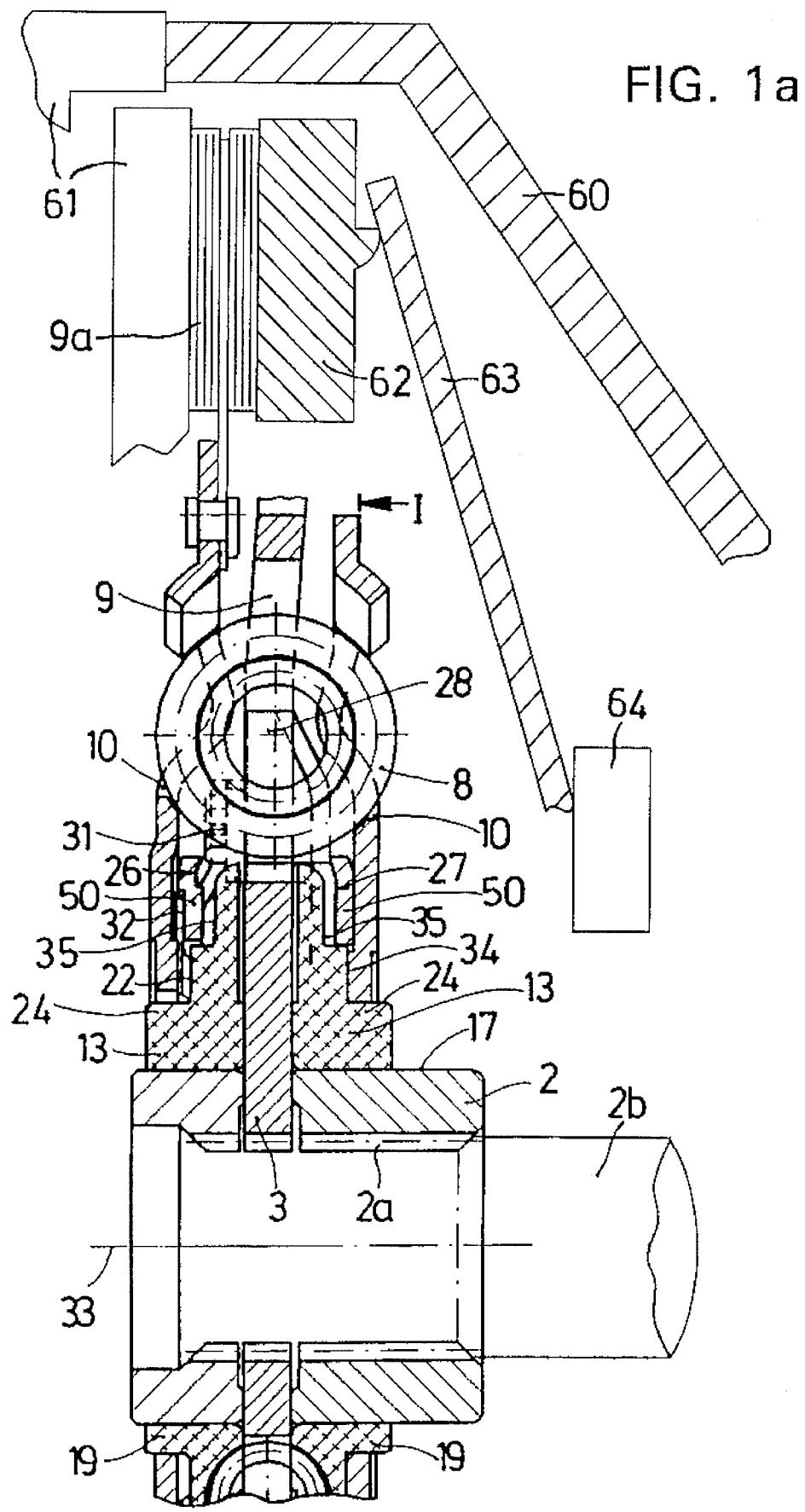
FIG. 1a shows additional details of a clutch plate in the outer peripheral portion thereof.

As shown in FIG. 1, on the cylindrical outside diameter 17 of the hub 2, rotationally installed on both sides of the hub disc 3, there can preferably be guide pieces 13. Each of the guide piece 13 can preferably be designed with a collar 19 in its radially inner portion. The collars 19, in the installed position on the hub 2, should preferably point away from the hub disc 3. Each guide piece 13 preferably extends radially into the space between the hub disc 3 and each of the lining support 4 and the cover plate 6. These guide pieces 13 can preferably extend approximately to the inside diameter of the envelope circle of the coil springs 8 for the load range.

Each guide piece 13 can also have, in the area facing the hub disc 3, several pockets 18 distributed over the circumference of the guide piece 13. These pockets 18, as shown in FIG. 2, can preferably be bounded on the circumference by control edges 21, whereby the coil springs 11 for the idle range can be actuated by these control edges 21.

Figure 2:
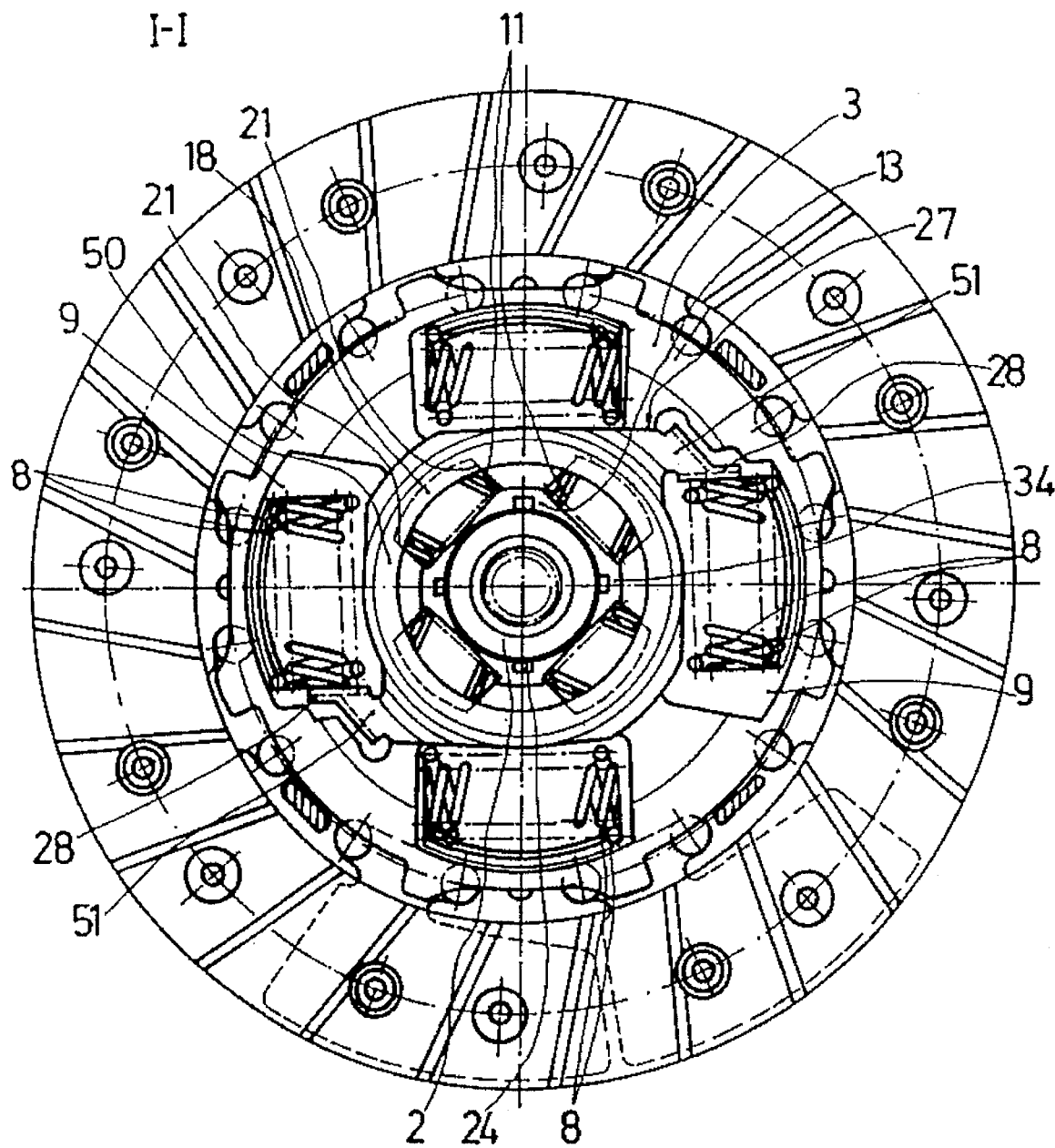
FIG. 2 shows a view of the clutch plate of FIG. 1 taken along line I—I in FIG. 1.

As shown in FIGS. 1 and 2, each collar 19 can preferably have, distributed over a circumference thereof, several lugs 24. These lugs 24 preferably project radially outwardly, and can preferably be engaged in corresponding recesses in the lining supports 4 and in the cover plate 6, preferably without play or clearance in the circumferential direction. In this manner, the two guide parts 13 can be non-rotationally connected to the lining support 4 and the cover plate 6.

Adjacent to the outside diameter of the lugs 24 of the guide parts 13 and somewhat recessed in the axial direction, there can preferably be a radially-running surface 34 as shown in FIG. 1. This radially-running surface 34 can preferably serve as a contact surface with respect to the cover plate 6, and can also serve, on the opposite side, as a contact surface for a disc-shaped spring element 22.

Adjacent to the radially-running surface 34, and radially outwardly, there can preferably be a shoulder 35, which shoulder 35 can preferably be oriented substantially radially as is surface 34. This shoulder 35 can preferably be provided on both guide parts 13 to hold encircling base bodies 50 of load friction discs 26 and 27. FIGS. 3, 3a and 3b show enlarged details of the load friction disc 27.

On the base body 50, webs 51 can preferably be provided diagonally opposite to one another. Each of the webs 51 can preferably support a stop tab 28. The stop tabs 28 can preferably be formed by bending the web 51 laterally, so that a tab part 52, running approximately at right angles to the web 51, is formed. In addition, the radially outer end of the web 51 can preferably be designed, along a portion of its width, to form an axial support 30. This axial support 30 can be equipped at its free end with stops 31. The stops 31, after the axial support 30 is disposed through openings 41 (see FIG. 1) in the hub plate 3, are preferably configured to contact corresponding parts of the load friction disc 26, preferably without clearance in the circumferential direction. Thus, the stops 31 can essentially provide a non-rotational connection between the two load friction discs 26 and 27.

On the side of the support 30 facing the tab part 52 (see FIG. 3), another portion of the web 51 can be bent so that a second tab part 53 can be formed. The plane of this tab part 53 can preferably run approximately parallel to a plane of the first tab part 52, but other angular dispositions could also be provided, for example, angles of between about 90 degrees to about 180 degrees (parallel). Alternatively, one could deem these tab parts 52 and 53 to be at about 360 degrees with respect to one another. The tab part 52 can preferably be connected by means of a first bent edge 54 to the tab part 53. In addition, the tab part 52 can also be connected, by means of an additional bent edge 55, to the web 51. As such, the tab part 52 can be supported by means of the bent edge 54 on the web 51 and by means of the bent edge 55 on the support 30. This support 30 can thereby act as a brace 56 for the tab parts 52 and 53 and thus for the stop tabs 28. This brace 56 can preferably be disposed at a substantial angle with respect to the tab parts 52 and 53, which angle can, in at least one embodiment of the present invention possibly be about 128 degrees. In essence, this angle could range from between about 90 degrees to possibly about 145 while still being able to serve a reinforcement function.

As shown in FIG. 3a, it is also possible, in at least one additional embodiment of the present invention, to configure the planes of extension of the tab parts 52 and 53, so that the planes do not run completely parallel. As such, the tab parts 52 and 53 can define a small angle (alpha) between them. This angle (alpha) could, in at least one embodiment of the invention, preferably be in a range of between about 7 degrees to about 10 degrees. Thus, when a force is applied by the spring 8, which spring 8 comes into contact with the tab part 52, in an area which projects radially beyond the brace 56, the angle (alpha) can permit an elastic deflection movement of the tab part 52 toward the second tab part 53, so that the elastic deflection (alpha) can flexibly absorb at least a portion of the applied force. As soon as the tab part 52 comes into contact with the tab part 53, after a deflection movement, the tab part 53 can then act as the force-absorbing cross section reinforcement 57 for the tab part 52 and thus for the stop tabs 28.

In the depicted embodiment of FIG. 3, the tab part 52 essentially is disposed at an angle of about 150 degrees with respect to a radial line drawn from the axis of rotation to the radially inner edge of the tab part 52. With such a configuration, the tab part 52 can preferably be disposed substantially parallel to an end surface of a spring disposed about the friction disc 27.

As shown in FIG. 1, between the load friction disc 26 and the lining support 4, there can also preferably be a spring 32 which generates the friction force for the load range. The spring 32 can preferably act on the load friction disc 26, which disc 26 essentially transmits the axial force via the supports 30 to the load friction disc 27. Consequently, the force of the spring 32 can be transmitted to the opposite load friction disc 27, which disc 27 can be supported with its base body 50 on the inside of the cover plate 6.

The operation of at least one embodiment of the clutch plate in accordance with the present invention can be described schematically as follows. In the idle range, a friction force, which can result from the force of the spring 22 and from the friction between the two guide parts 13 and the hub disc 3, can be applied to apply pressure to the springs 11. The guide parts 13 can preferably be formed, at least in their friction areas which interact with the hub disc 3, so that direct contact occurs essentially only in the radially inner area, and thus the active friction radius can be kept small.

When the idle range is exceeded, i.e. when there is contact between the stop tabs 28 of the load friction disc 27 and the corresponding control edge of the aperture 9 in the hub disc 3 for the corresponding springs 8, the two load friction discs 26 and 27 can be held stationary in relation to the hub disc 3. Thus, there can be a relative motion of these two load friction discs with respect to the lining support 4 and the cover plate 6 respectively. The friction force thereby generated can essentially be a function of the force of a spring 32 and the pair of materials involved, that is the material used for constructing the friction discs 26, 27 and the lining support 4 or cover plate 6. In the load range, the friction force can thereby be composed of the friction already applied in the idle range and the friction generated by the two load friction discs 26 and 27. As such, it can therefore be possible to regulate the two friction forces essentially completely independently of one another.

At approximately this juncture, the stop tabs 28 could thereby be in contact with two springs 8 which are located in identical apertures 9 of the hub disc 3 and in identical apertures 10 of the lining support 4 and the cover plate 6. It should also be noted that the two stop tabs 28 can respectively be in contact with the effectively identical end surfaces of the corresponding spring 8. In the present case, the result would thereby typically be a friction force in the load range which is applied only in the one direction of rotation, e.g. the thrust direction, and would not be applied in the other direction of rotation, on account of the absence of corresponding stop tabs, i.e., at the other ends of the springs 8.

The function can be further explained as follows with reference to FIG. 2: With regard to the following, it should be assumed that only the stop tabs 28 which act in the counterclockwise direction are present. Then, when torque would be applied to the friction linings in the counterclockwise direction, and when the hub 2 is held stationary, the additional friction for the load range can be applied if the corresponding springs 8 are in contact with the control edges of the aperture 9 of the hub disc 3, which are oriented counterclockwise. When the torque decreases, the additional friction applied by means of the two load friction discs 26 and 27 can remain effective until the springs 8 break contact with the control edges of the apertures 9. From that moment on, the two load friction discs 26 and 27 can move along with the lining support 4 and the cover plate 6, on account of their friction force, and thus would essentially no longer make any contribution to the generation of the friction force.

Figure 4:
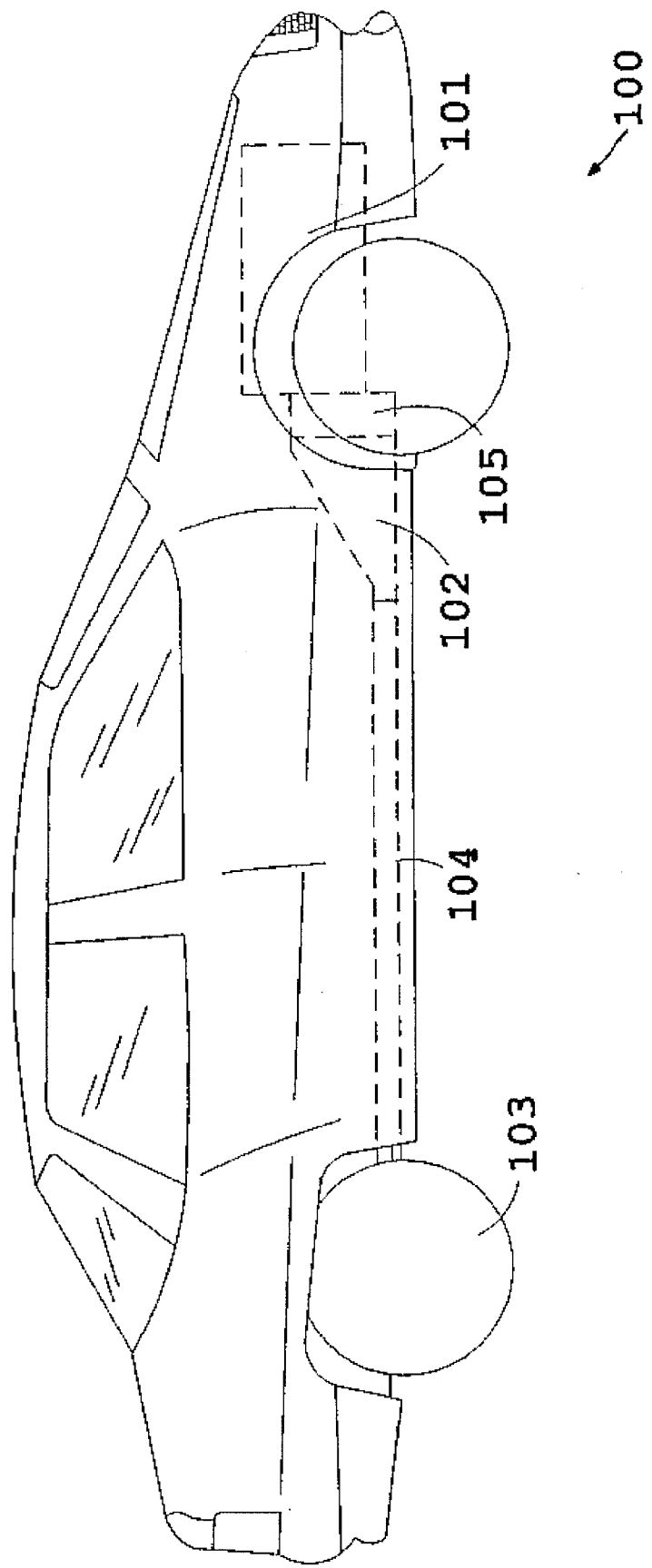
FIG. 4 shows a generalized depiction of a motor vehicle having a friction clutch.

FIG. 4 depicts what could be considered to be a typical motor vehicle 100 and corresponding power transmission components thereof. Such a motor vehicle 100 could typically have an internal combustion engine 101 mounted in a forward section thereof. The motor vehicle could also typically have a transmission 102 for transmission of mechanical power from the engine 101 to the rear vehicle wheels 103, via a drive shaft 104. A friction clutch 105 could preferably be provided, in accordance with the present invention, for engaging the transmission 102 with the engine 101. This friction clutch could concisely correspond to the friction clutch depicted in FIGS. 1 and 2.

One feature of the invention resides broadly in the clutch plate for a motor vehicle friction clutch, comprising a hub with a hub disc concentric to an axis of rotation, a lining support located on the one side for the friction linings, a cover plate located on the other side and non-rotationally connected to the lining support, coil springs for the load range which are located in apertures in the hub disc on one hand and in the lining supports and cover plates on the other hand, and are in contact on one end with control edges of the apertures of the lining support and cover plate, but on the other end with stop tabs of load friction discs located on both sides of the hub disc, at least one of which friction discs has webs to hold stop tabs on a ring-shaped base-body, characterized by the fact that each stop tab 28 is designed in one piece both with the web 51 and also with a brace 56 oriented at an angle to the web 51, and in the area of engagement of the spring 8 has a reinforced cross section 57 which can be deformed elastically by the application of force.

Another feature of the invention resides broadly in the clutch plate, characterized by the fact that each stop tab 28 has a portion which projects beyond the brace 56 in the radial direction and is provided for the application of force.

Yet another feature of the invention resides broadly in the clutch plate, characterized by the fact that the stop tab 28 has a first tab part 52 which is connected to the web 51 and a second tab part 53 which is designed as one piece with the brace 56, and acts as a cross section reinforcement 57, which is bent at an angle between 90 degrees and 180 degrees in relation to the first tab part 52.

Still another feature of the invention resides broadly in the clutch plate, characterized by the fact that the angle between the two tab parts 52, 53 is approximately 180 degrees.

Yet still another feature of the invention resides broadly in the clutch plate, characterized by the fact that the brace 56 is designed on a load friction disc 27 and can be used as an axial support 30 for the other load friction disc 26.

Some examples of clutch discs having control plates, which could have components which are interchangeable with the embodiments of the present invention, may be disclosed by the following U.S. patents: U.S. Pat. Nos. 5,201,394 to Suzuki, entitled "Clutch Disk Assembly"; 4,577,742 to Saida, entitled "Clutch Disc"; 4,044,874 to Worner, entitled "Clutch Disc With Plural Friction Dampers"; and 3,982,617 to Worner, entitled "Clutch Disc for Main Clutches of Motor Vehicles".

Some examples of clutch discs having thrust rings, which could have components which are interchangeable with the embodiments of the present invention, may be disclosed by the following U.S. patents: U.S. Pat. No. 4,863,005 to Parzefall, entitled "Friction Clutch"; 4,832,166 to Parzefall, entitled "Friction Clutch for Motor Vehicles"; and 4,699,594 to Weissenberger and Hayen, entitled "Clutch Disc for a Motor Vehicle Friction Disc Clutch".

Additional examples of clutch discs and friction linings, which could have components interchangeable with the embodiments of the present invention, may be disclosed by the following U.S. patents: U.S. Pat. Nos. 5,000,304 to Koch et al., entitled "Clutch Disc"; 4,941,558 to Schraut, entitled "Clutch Disc"; 4,854,438 to Weissenberger and Huditz, entitled "Clutch Disc for a Friction Disc Clutch"; 4,741,423 to Hayen, entitled "Clutch Disc for a Friction Clutch"; and 4,715,485 to Rostin et al., entitled "Clutch Disc for a Motor Vehicle Friction Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission for a motor vehicle, said friction clutch comprising:
    a housing;
    a clutch plate disposed within said housing, said clutch plate defining an axis of rotation and an axial direction parallel to said axis of rotation;
    pressure plate means disposed at least partly within said housing and movable in the axial direction, said pressure plate means being configured for applying an axial force to said clutch disc along the axial direction;
    a biasing device for biasing said pressure plate means in the axial direction to apply said axial force to said clutch disc;
    means for applying an opposing force to said biasing means to release the axial force being applied by said biasing means to said pressure plate means;
    said clutch plate comprising:
        a hub, said hub comprising means for engaging shaft means of a transmission;
        a hub disc disposed concentrically about said hub and extending radially away from said hub, said hub disc having a first side and a second side;
        a first cover plate disposed adjacent said first side of said hub;
        a second cover plate disposed adjacent said second side of said hub;
        at least one of said first and second cover plates comprising at least one friction lining;
        said first and second cover plates being relatively rotatable about said hub with respect to said hub disc;
        biasing means for torsionally damping relative rotation between said hub disc and said first and second cover plates;
        at least one friction disc disposed about said hub between said hub disc and one of said first and second cover plates;
        said at least one friction disc having a main surface disposed substantially transverse to said axis of rotation;
        said at least one friction disc comprising at least one first portion for engaging with said biasing means;
        said at least one first portion comprising:
            a first substantially planar member having a first surface and a second surface, said first surface being substantially transverse to said main surface, said first surface being disposed to engage said biasing means and receive biasing force of said biasing means, and said second surface being disposed opposite said first surface; and
            a second substantially planar member disposed in contact with said second surface for reinforcing said at least one first substantially planar member and increasing rigidity of said first substantially planar member.

2. The friction clutch according to claim 1, wherein:
    said friction disc comprises a ring-shaped member disposed about said hub;
    said at least one first portion comprises a third substantially planar member extending from said ring-shaped member;
    said third substantially planar member defining a plane substantially perpendicular to said main surface;
    said first and second substantially planar members being disposed on said third substantially planar member; and
    said second substantially planar member being disposed at a substantial angle with respect to said first planar member.

3. The friction clutch according to claim 2, wherein:
    said first substantially planar member comprises a first bent-over portion of said third substantially planar member;
    said second substantially planar member comprises a second bent-over portion of said third substantially planar member; and
    said first bent-over portion being disposed at a substantial angle with respect to said second bent-over portion.

4. The friction clutch according to claim 3, wherein:
    said second bent-over portion intersects the second side of said first bent over portion at a locus of intersection;
    said first bent-over portion comprises an additional portion which extends a distance radially away from said second bent-over portion; and said additional portion of said first bent-over portion being configured for contacting said biasing means and receiving biasing force from said biasing means.

5. The friction clutch according to claim 4, wherein said additional portion extending radially away from said second bent-over portion comprises a further reinforcement member, said further reinforcement member being integral with said second bent-over portion, and said further reinforcement member being disposed at an angle, measured in the plane of said third substantially planar member, of between about 90 degrees and about 180 degrees with respect to said additional portion.

6. The friction clutch according to claim 5, wherein:

said angle is about 180 degrees and said additional portion is substantially parallel to said further reinforcement member;

at least a part of said additional portion being disposed spaced apart from said further reinforcement member;

said at least a part of said additional portion being elastically deformable towards said further reinforcement member by means of the biasing force to absorb at least a portion of the biasing force.

7. The friction clutch according to claim 6, wherein:

said additional portion and said further reinforcement member collectively comprise an integral member bent about a common bend to form a substantially U-shaped member;

said substantially U-shaped member comprises a first leg and a second leg, at least a part of said first leg comprising said additional portion, and said second leg comprising said further reinforcement member;

said first leg having a first end disposed away from said common bend and a second end disposed at said common bend, and said second leg having a first end disposed away from said common bend and a second end disposed at said common bend;

said first leg is disposed at an angle of between about 7 degrees to about 13 degrees with respect to said second leg; and said first end of said first leg being elastically deformable towards said first end of said second leg to absorb said at least a portion of the biasing force.

8. The friction clutch according to claim 7, further including:

said second bent-over portion being disposed substantially circumferentially about said axis of rotation and at an angle of between about 120 degrees to about 140 degrees with respect to said first bent-over portion;

said first and second cover plates, and said hub disc each comprising at least one window substantially aligned with a window of the others of said first and second cover plates and said hub disc;

said biasing means being disposed within said substantially aligned windows;

said friction disc comprising a first axial side for being disposed adjacent said hub disc and a second axial side disposed opposite said first axial side and away from said hub disc towards one of said first and second cover plates;

said first leg and said second leg being disposed from said third substantially planar member, in a direction away from said first axial side of said friction disc and into said window of said hub disc;

said second leg being configured to engage with an edge of said window of said hub disc;

said friction disc having an inner edge defining an interior thereof, and an outer edge defining an exterior thereof, the outer edge substantially defining a circumference of said friction disc;

said first bent-over portion having an inner edge disposed towards said outer edge of said friction disc and an outer edge disposed away from said inner edge; and said plane of said first bent-over portion being disposed transverse to the main surface and at an angle of about 150 degrees with respect to a radial line from said axis of rotation to said first edge of said first leg.

9. The friction clutch disc according to claim 8, further including:

said second bent-over portion being disposed at an angle of about 128 degrees with respect to said first and second legs;

said third substantially planar member extends from said main surface in a radial direction away from said hub and also in an axial direction towards said hub disc of said friction clutch;

said first and second cover plates, and said hub disc, each comprises at least two windows therein, with each window of one of: said first and second cover plates and said hub disc being substantially aligned with a corresponding window of the others of said first and second cover plates and said hub disc;

said biasing means comprises at least two spring members, with at least one spring member disposed in each of said aligned windows;

said at least one first portion for engaging comprises first and second portions for engaging, each of said first and second portions for engaging comprising said third substantially planar member, said first leg, said second leg, and said second substantially planar member;

said first and second portions for engaging are disposed diagonally opposite one another about said friction disc;

each of said first and second portions for engaging being disposed for engaging different ones of said at least two spring members; and said at least two spring members are disposed opposite one another about said friction disc.

10. The friction clutch according to claim 9, wherein:

said plane of said first bent-over portion of each of said first and second portions for engaging are disposed substantially parallel to one another;

said friction disc defines a central plane passing through said axis of rotation and substantially parallel to said plane of said first leg of each of said first and second portions for engaging;

said plane of said first bent-over portion of said first portion for engaging being spaced apart from said central plane of said friction disc in a first direction;

said plane of said first bent-over portion of said second portion for engaging being spaced apart from said central plane of said friction disc in a second direction opposite to said first direction;

said clutch plate comprises one said friction disc on each side of said hub disc;

at least one of said friction discs comprising said first and second portions for engaging;

said second bent-over portion of said at least one of said friction discs extends through said hub disc to engage the other of said friction discs to non-rotationally connect said friction discs;

said second bent-over portion comprises means for engaging the other of said friction discs;

said hub further comprises two guide discs disposed thereabout, with one guide disc disposed on each side of said hub disc;

each said guide disc comprising a first axially stepped shoulder;

said first and second cover plates being disposed about said axially stepped shoulders;

each said guide disc further comprises, axially toward said hub disc and radially away from said hub, a second axially stepped shoulder;

each said friction disc being disposed about said second axially stepped shoulder;

said clutch plate further comprises:
  a first disc spring disposed between one of said first and second cover plates and said guide disc;
  a second disc spring disposed between one of said first and second cover plates and one of said friction discs;

each said guide disc further comprises a further set of radially disposed openings and said hub disc further comprises radially disposed openings aligned with said openings of said guide disc;

said aligned openings between said hub disc and said guide discs comprising spring means disposed therein, said spring means in said aligned openings being configured for damping torsional movements of said hub disc in an idle range of said clutch plate;

said clutch plate further comprises rivet means for non-rotationally connecting said first cover plate to said second cover plate, said rivet means being configured to maintain said first and second cover plates at a substantially fixed distance with respect to one another;

one of said first and second cover plates comprises:
  means for supporting a pair of friction linings about said one of said first and second cover plates;
  a pair of friction linings supported on said means for supporting;

said clutch plate comprises four of said spring members; and said hub comprises internal teeth for non-rotationally engaging shaft means of a transmission.

11. A clutch plate for a friction clutch, said clutch plate defining an axis of rotation and an axial direction parallel to said axis of rotation, and said clutch plate comprising:
  a hub, said hub comprising means for engaging shaft means of a transmission;
  a hub disc disposed concentrically about said hub and extending radially away from said hub, said hub disc having a first side and a second side;
  a first cover plate disposed adjacent said first side of said hub;
  a second cover plate disposed adjacent said second side of said hub;
  at least one of said first and second cover plates comprising at least one friction lining;
  said first and second cover plates being relatively rotatable about said hub with respect to said hub disc;
  biasing means for torsionally damping relative rotational movement between said hub disc and said first and second cover plates;
  at least one friction disc disposed about said hub between said hub disc and one of said first and second cover plates, said at least one friction disc defining a main surface substantially transverse to said axis of rotation;

said at least one friction disc comprising at least one portion for engaging with said biasing means;

said at least one portion for engaging comprising means for engaging with and receiving a biasing force of said biasing means;

said means for engaging comprising first and second planar members, said first and second planar members being disposed substantially parallel to one another and substantially transverse to said main plane, with said first planar member disposed towards said biasing member, and with at least a portion of said first planar member disposed spaced apart from said second planar member; and said at least a portion of said first planar member being elastically deformable towards said second planar member by means of the biasing force to absorb at least a portion of the biasing force.

12. The clutch plate according to claim 11, wherein:
said at least one portion for engaging comprises a first projection of said friction disc, said first projection extending radially away from said axis of rotation;

said first projection defining a plane, said plane of said projection being substantially parallel to said main surface; and said first and second planar members respectively comprise first and second bent tabs of said first projection, said first and second bent tabs being bent about a common bend to form a substantially U-shaped member comprising said means for engaging.

13. The clutch plate according to claim 12, wherein:
said substantially U-shaped member comprises a first leg comprising said first tab and a second leg comprising said second tab;

said first leg having a first end disposed away from said common bend and a second end disposed at said common bend, and said second leg having a first end disposed away from said common bend and a second end disposed at said common bend; and said first end of said first leg being elastically deformable towards said first end of said second leg, to absorb said at least a portion of the biasing force.

14. The clutch plate according to claim 13, wherein said first leg is disposed at an angle of between about 7 degrees to about 13 degrees with respect to said second leg.

15. The clutch plate according to claim 14, wherein:
said first projection additionally comprises a third planar member, said third planar member defining a plane substantially transverse to the main surface; and said third planar member having a portion disposed adjacent said first and second legs to reinforce said means for engaging by increasing a rigidity of at least one of said first and second leg portions.

16. The clutch plate according to claim 15, wherein:
said third planar member comprises a continuation of said second leg, said continuation being disposed at an angle to said first and second legs;

said third planar member being disposed substantially circumferentially about said axis of rotation and at an angle of between about 120 degrees to about 140 degrees with respect to said first and second legs; and said second leg being disposed radially outwardly of said third planar member.

17. The clutch plate according to claim 16, wherein:

said first and second cover plates, and said hub disc, each comprises at least one window substantially aligned with a window of the others of said first and second cover plates and said hub disc;

said biasing means being disposed within said substantially aligned windows;

said friction disc comprises a first axial side for being disposed adjacent said hub disc, and a second axial side disposed opposite said first axial side and away from said hub disc towards one of said first and second cover plates;

said first leg and said second leg are disposed away from said first projection, from said first axial side of said friction disc and into said window of said hub disc;

said second leg being configured to engage with an edge of said window of said hub disc;

said friction disc having an inner edge defining an interior thereof, and an outer edge defining an exterior thereof, the outer edge substantially defining a circumference of said friction disc;

said first leg having an inner edge disposed towards said outer edge of said friction disc and an outer edge disposed away from said inner edge; and said first leg defining a plane, said plane of said first leg being disposed transverse to the main plane and at an angle of about 150 degrees with respect to a radial line from said axis of rotation to said first edge of said first leg.

18. The clutch plate according to claim 17, further including:

said third planar member being disposed at an angle of about 128 degrees with respect to said first and second legs;

said first projection extends from said main surface in a direction radially away from said hub and also in a direction axially towards said hub disc;

said first and second cover plates and said hub disc each comprises at least two windows therein, with each window of one of: said first and second cover plates and said hub disc being substantially aligned with a corresponding window of the others of said first and second cover plates and said hub disc;

said biasing means comprises at least two spring members, with at least one spring member disposed in each of said aligned windows;

said at least one portion for engaging comprises first and second portions for engaging, each of said first and second portions for engaging comprising said first projection, said first leg, said second leg, and said third planar member; and each of said first and second portions for engaging comprising means for engaging different ones of said at least two spring members.

19. The clutch plate according to claim 18, wherein:

said first and second portions for engaging are disposed diagonally opposite one another about said friction disc;

said at least two spring members are disposed opposite one another about said friction disc;

said plane of said first leg of each of said first and second portions for engaging are disposed substantially parallel to one another;

said friction disc defining a central plane passing through said axis of rotation and substantially parallel to said plane of said first leg of each of said first and second portions for engaging;

said plane of said first leg of said first portion for engaging being spaced apart from said central plane of said friction disc in a first direction;

said plane of said first leg of said second portion for engaging being spaced apart from said central plane of said friction disc in a second direction opposite to said first direction; and said clutch plate comprises one said friction disc on each side of said hub disc.

20. The clutch plate according to claim 19, wherein:

at least one of said friction discs comprises said first and second portions for engaging and corresponding means for engagement;

said third planar member of said at least one of said friction discs extends through said hub disc to engage the other of said friction discs to non-rotationally connect said friction discs;

said third planar member comprises means for engaging the other of said friction discs;

said hub further comprises two guide discs disposed thereabout, with one guide disc disposed on each side of said hub disc;

each said guide disc comprising a first axially stepped shoulder;

said first and second cover plates being disposed about said axially stepped shoulders;

each said guide disc further comprises, axially toward said hub disc and radially away from said hub, a second axially stepped shoulder;

each said friction discs being disposed about said second axially stepped shoulder;

said clutch plate further comprises:
a first disc spring disposed between one of said first and second cover plates and said guide disc;
a second disc spring disposed between one of said first and second cover plates and one of said friction discs;

each said guide disc further comprises a further set of radially disposed openings and said hub disc further comprises radially disposed openings aligned with said openings of said guide disc;

said aligned openings between said hub disc and said guide discs comprising spring means disposed therein, said spring means in said aligned openings being configured for damping torsional movements of said hub disc in an idle range of said clutch plate;

said clutch plate further comprises rivet means for non-rotationally connecting said first cover plate to said second cover plate, said rivet means being configured to maintain said first and second cover plates at a substantially fixed distance with respect to one another;

one of said first and second cover plates comprises:
means for supporting a pair of friction linings about said one of said first and second cover plates;
a pair of friction linings supported on said means for supporting;

said clutch plate comprises four of said spring members; and said hub comprises internal teeth for non-rotationally engaging shaft means of a transmission.

* * * * *

UNITED STATES PATENT AND TRADEMARK OFFICE
CERTIFICATE OF CORRECTION

PATENT NO. : 5,542,516
DATED : August 6, 1996
INVENTOR(S) : Erwin WACK

It is certified that error appears in the above-indentified patent and that said Letters Patent is hereby corrected as shown below:

In column 5, line 60, after 'guide', delete "piece" and insert --pieces--.

In column 9, line 22, after 'and', delete "4,699,594" and insert --4,669,594--.

Signed and Sealed this

Seventh Day of January, 1997

Attest:

BRUCE LEHMAN

Attesting Officer
Commissioner of Patents and Trademarks